US 7,061,366 B2

United States Patent
Bell et al.

(10) Patent No.: US 7,061,366 B2
(45) Date of Patent: Jun. 13, 2006

(54) FINDING LOCATION AND RANGING EXPLORER

(75) Inventors: Stephen McMorris Bell, Mill Creek, WA (US); Son VoBa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 114 days.

(21) Appl. No.: 10/822,500

(22) Filed: Apr. 12, 2004

(65) Prior Publication Data

US 2005/0225427 A1    Oct. 13, 2005

(51) Int. Cl.
G05B 19/00    (2006.01)

(52) U.S. Cl. .................... 340/5.2; 340/572.3; 235/375; 713/155

(58) Field of Classification Search ................ 340/5.2, 340/572.3, 572.1; 235/375; 713/155; 726/17, 726/20; 380/270, 5.8, 5.81, 5.85
See application file for complete search history.

(56) References Cited

U.S. PATENT DOCUMENTS

| | | | | |
|---|---|---|---|---|
| 6,070,240 A | * | 5/2000 | Xydis | 726/17 |
| 6,189,105 B1 | * | 2/2001 | Lopes | 726/20 |
| 6,401,209 B1 | * | 6/2002 | Klein | 726/34 |
| 6,483,441 B1 | * | 11/2002 | Hinde | 340/932.2 |

OTHER PUBLICATIONS

Arpaci-Dusseau, Andrea C., et al., "Transforming Policies into Mechanisms with Infokernel," *ACM Symposium on Operating Systems Principles*, Oct. 29-22, 2003, Bolton Landing, New York, pp. 90-105.

Brunette, Waylon, et al., "Proximity Interactions between Wireless Sensors and their Application," *ACM International Conference on Wireless Sensor Networks and Applications*, Sep. 19, 2003, San Diego, California, pp. 30-37.

Greenberg, Saul, et al., "Customizable Physical Interfaces for Interacting with Conventional Applications," *ACM Symposium on User Interface Software and Technology*, Oct. 27-30, 2002, Paris, France, pp. 31-40.

Kindberg, Tim, et al., "People, Place, Things: Web Presence for the Real World," *Mobile Networks and Applications*, 7, 2002, pp. 365-376.

Kindberg, Tim, et al., "Towards a Real-World Wide Web," *ACM SIGOPS European workshop: beyond the PC: new challenges for the operating system*, Sep. 2000, 6 pages.

(Continued)

*Primary Examiner*—Anh V. La
(74) *Attorney, Agent, or Firm*—Woodcock Washburn LLP (57) ABSTRACT

An RFID tag is used to determine the presence or absence of a user. Rules or instructions responsive to this presence or absence are implemented to control a device or multiple devices accordingly. In this manner, a device can be maintained in a normal operating mode if a user is present, even though a user is not actively interacting with the device. Moreover, the device can be shut down or locked or be on restricted access if an authorized user is no longer in the presence of the device.

31 Claims, 8 Drawing Sheets

OTHER PUBLICATIONS

Lane, Terran, et al., "Temporal Sequence Learning and Data Reduction for Anomaly Detection," *ACM Transactions on Information and System Security*, vol. 2, No. 3, Aug. 199, pp. 295-331.

Lockwood, John W., et al., "Automated Tools to Implement and Test Internet Systems in Reconfigurable Hardware," *ACM SIGCOMM computer Communications Review*, vol. 33, No. 3, Jul. 2003, pp. 103-110.

Ross, David A., et al. "Wearable Interfaces for Orientation and Wayfinding," *ACM Conference on Assistive Technologies*, Arlington, Virginia, Nov. 2000, pp. 193-200.

Sekar, R., et al. "Specification-based Anomaly Detection: A New Approach for Detecting Network Intrusions," *ACM Conference on Computer and Communications Security*, Nov. 18-22, 2002, Washington, D.C., pp. 265-274.

Smith, Marc A., "Some Social Implications of Ubiquitous Wireless Networks," *Mobile Computing and Communications Review*, vol. 4, No. 2, Apr. 2002, pp. 25-36.

Zheng, R., et al. "Asynchronous Wakeup for Ad Hoc Networks," *ACM International Symposium on Mobil Ad Hoc Networking & Computing*, Jun. 1-3, 2003, Annapolis, Maryland, pp. 35-45.

\* cited by examiner

FINDING LOCATION AND RANGING EXPLORER

FIELD OF THE INVENTION

This invention relates in general to the field of radio frequency identification (RFID) tags. More particularly, this invention relates to the use of RFID tags to establish the presence of users and control devices accordingly.

BACKGROUND OF THE INVENTION

Radio frequency identification (RFID) transponders or tags are well known and come in a wide variety of shapes and sizes. They can be as small as a pencil lead in diameter and one-half inch in length. They can be credit-card shaped for combined use with barcode visual inspection applications. RFID tags can also be used for inventory and security purposes. For example, the anti-theft hard plastic tags attached to merchandise in stores are RFID tags.

RFID tags are categorized as either active or passive. Active RFID tags are powered by an internal battery and are typically read/write, i.e., tag data can be rewritten and/or modified, and typically last up to four years. However, active tags are less desirable in many applications due to their cost, size, and longevity limitations.

Passive RFID tags operate without a separate external power source and obtain operating power from a reader. Passive tags are consequently much lighter than active tags, less expensive, and offer a virtually unlimited operational lifetime. Read-only tags are typically passive and generally are programmed with a unique set of data (usually 32 to 128 bits) that cannot be modified.

RFID-based designs provide for noncontact, non-line-of-sight sensing. Tags can be employed by a vendor for different purposes during the entire life-cycle of the equipment, from manufacturing to distribution to sales to deployment to services and finally disposal. Tags can be employed by the customers for a wide range of purposes as well, including site capacity planning, asset management, and protection.

Determining an individual user's presence is vital for the growing adoption of realtime communications. Existing methods rely upon direct user interaction with an input device, such as a keyboard or mouse, to determine a user's status, i.e., if a user is online or away from his computer. Computers, devices, and other resources that may be used by an individual or group of individuals are generally not able to recognize the presence of a user or group of users without such direct interaction. Thus, although a user may be near his device such as a computer, if he is not actively directly interacting with it (e.g., by pressing a key or moving a pointer) within a certain predetermined time period, the device may go into a power saving mode (e.g., blank the screen), log the user out, or otherwise prohibit the user from immediately accessing the system. This is undesirable if, for example, the user is present and would like the device to remain in the normal operating mode although he is not directly interacting with it.

Similarly, in a conventional system, if a user directly interacts with the device and then, for example, leaves the room, the device typically remains powered on in the regular operating mode for a predetermined time. This is a security concern, as another user could enter the room and access the computer, although he may not be authorized to do so. Moreover, energy is wasted if the device remains powered on in the regular operating mode for a predetermined time after a user leaves the room.

In view of the foregoing, there is a need for systems and methods that overcome the limitations and drawbacks of the prior art.

SUMMARY OF THE INVENTION

The present invention is directed to the use of a radio frequency identification (RFID) tag to determine the presence or absence of a user. Rules or instructions responsive to this presence or absence are implemented to control a device or multiple devices accordingly. In this manner, a device can be maintained in a normal operating mode if a user is present, even though a user is not actively interacting with the device. Moreover, the device can be shut down or locked or be on restricted access if an authorized user is no longer in the presence of the device.

Exemplary embodiments include an RFID tag; a detector comprising an antenna, an RF interrogator, and an RF controller; and a central controller remote from the detector. The detector transmits interrogation signals to the RFID tag, receives and decodes presence signals from the RFID tag, and generates instruction signals. The central controller receives the instruction signals and controls at least one associated device in accordance with the instruction signals. The device(s) being controlled can include a personal computer, a telephone, a fax machine, and a photocopier, for example.

According to aspects of the invention, the detector is disposed within a keyboard, and the central controller is disposed within a computer, with the keyboard and the computer connected using wireless or wired technologies.

According to further aspects of the invention, the range of the RFID tag relative to the detector is determined, and the device, such as the computer, is controlled accordingly. Moreover, presence of multiple RFID tags (and hence multiple users) may be determined by the detector and the devices can be directed to operate in accordance with the individual users' predetermined authorizations and/or preferences.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention determines presence using radio frequency identification (RFID) wireless technology, and is independent of a user's interaction with a computer. Preferably, an RFID controller/reader is comprised within a keyboard used in conjunction with a computer.

Figure 1:
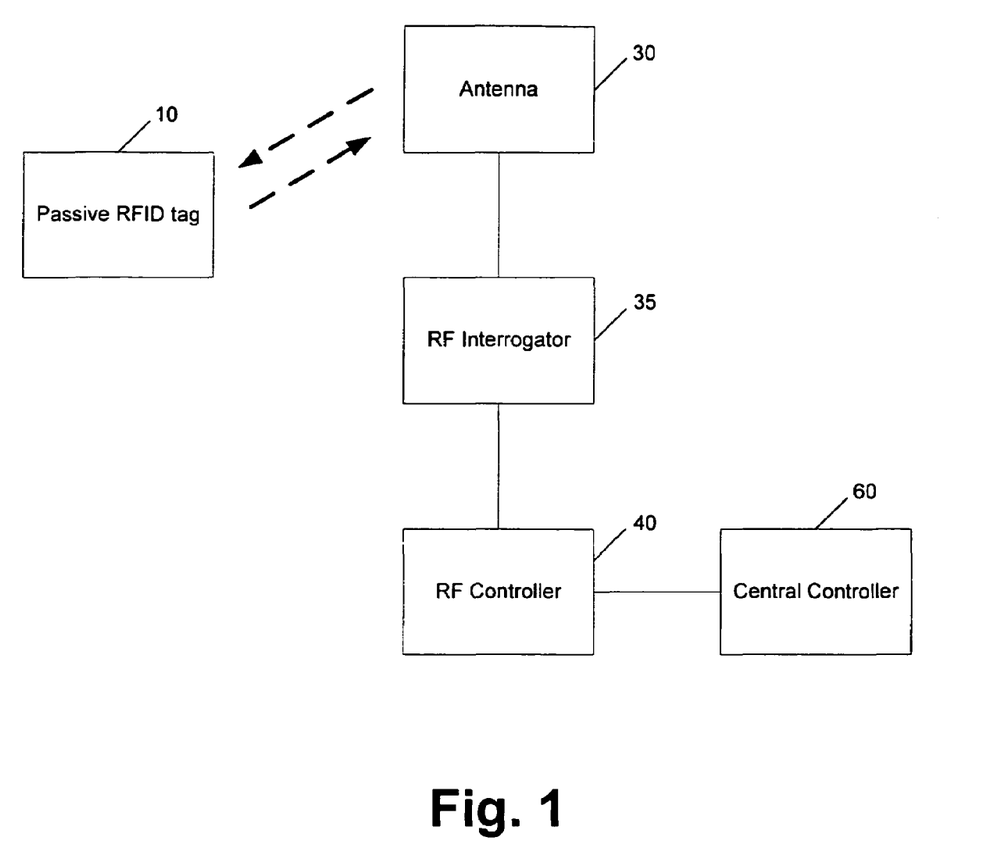
FIG. 1 is a block diagram of an exemplary RFID system in accordance with the present invention.

FIG. 1 is a block diagram of an exemplary RFID system in accordance with the present invention. An RF controller 40, which may be under control of a central controller 60, directs an RF interrogator 35 to search for the presence of an RFID transponder (referred to herein as an RFID tag) 10 by sending signals through an antenna 30. As used herein, a detector comprises the antenna 30, the RF interrogator 35, and the RF controller 40, for example.

More particularly, the RFID tag 10 is preferably a passive device that does not require a battery and contains integrated non-volatile memory that allows data to be written to and read from the tag. The tag can be programmed with the information either at installation or before installation (e.g., at a factory during manufacture). The information that can be programmed on the tag includes, for example, an identifier, access codes, and/or authorization codes. It is contemplated that the RFID tag 10 can be an active device, instead of a passive device. For example, active devices might become preferred for use in accordance with the present invention over passive devices as, e.g., active tag costs decline, active tag battery life is extended, active tag size decreases, and active tag reader/antennae form factors decrease, etc.

In accordance with the present invention, the tag 10 is used to signal the presence of a user to the RF controller 40 (via the RF interrogator 35 and the antenna 30), and ultimately the controller 60, if desired. The RF interrogator 35 generates an interrogatory signal and transmits this signal through the antenna 30 to the surrounding area. The antenna 30 may comprise a single antenna or multiple antennae and can be any type of appropriate antenna, such as an omnidirectional antenna.

Preferably, the RF interrogator 35 interrogates the surrounding area (via the antenna 30) for an RFID tag or tags a predetermined (and preferably programmable) number of times per a predetermined (and preferably programmable) period. For example, the surrounding area could be interrogated approximately 50 times per second. It is desirable that the antenna 30 and RF interrogator 35 can record a target RFID tag 10 at a range of 20 feet, though the range can be changed according to suit a user's desires. Characteristics that can be modified to affect the range include the interrogatory signal power level of the RF interrogator 35, the presence signal power level of the RFID tag 10, the detection threshold of the RF interrogator 30, and the characteristics of the antenna 30.

A presence signal from the RFID tag 10 is received by the antenna 30 and provided to the RFID controller 40 via the RFID interrogator 35. A microprocessor (within the controller 40 or separate from the controller 40) including decoder features, for example, can then act on the received signal to generate an appropriate output signal. This output signal can be provided via wired or wireless technologies to a remote computer (comprising central controller 60, for example), as described in further detail below.

The RFID controller 40 preferably is able to detect multiple RFID tags, desirably simultaneously. This allows multiple users to have their presence established.

It is desirable to determine if a user is in the presence of a device, such as a computer, and to provide that information to a realtime client. The realtime client then acts on the information. In this way, if a user is in the room, but not using the laptop computer, this information associated with the user's presence can be used to alert the laptop to enter (or not enter) an appropriate mode, such as standby or sleep.

Figure 2:
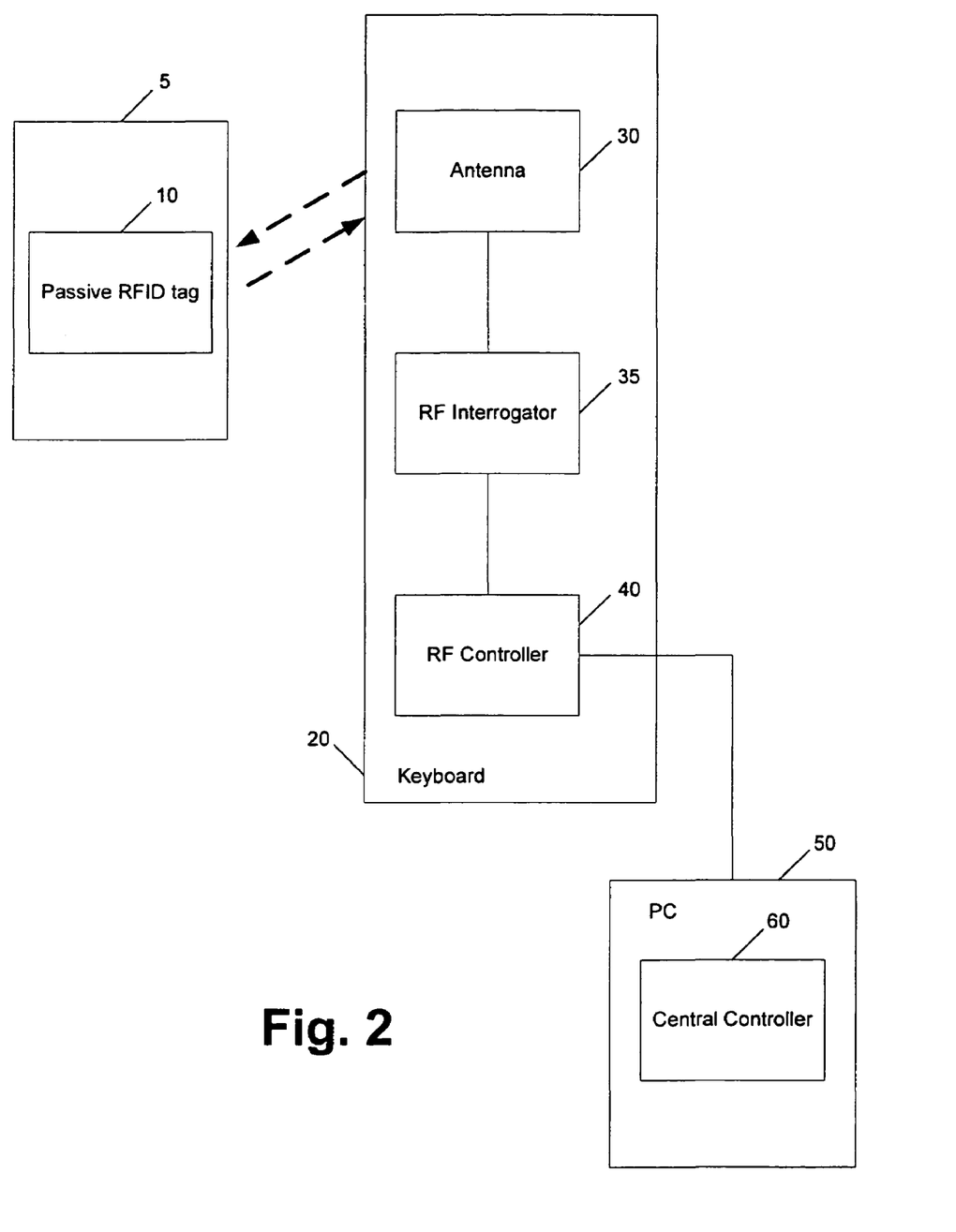
FIG. 2 is a block diagram of an exemplary RFID system including a keyboard in accordance with the present invention.
Figure 3:
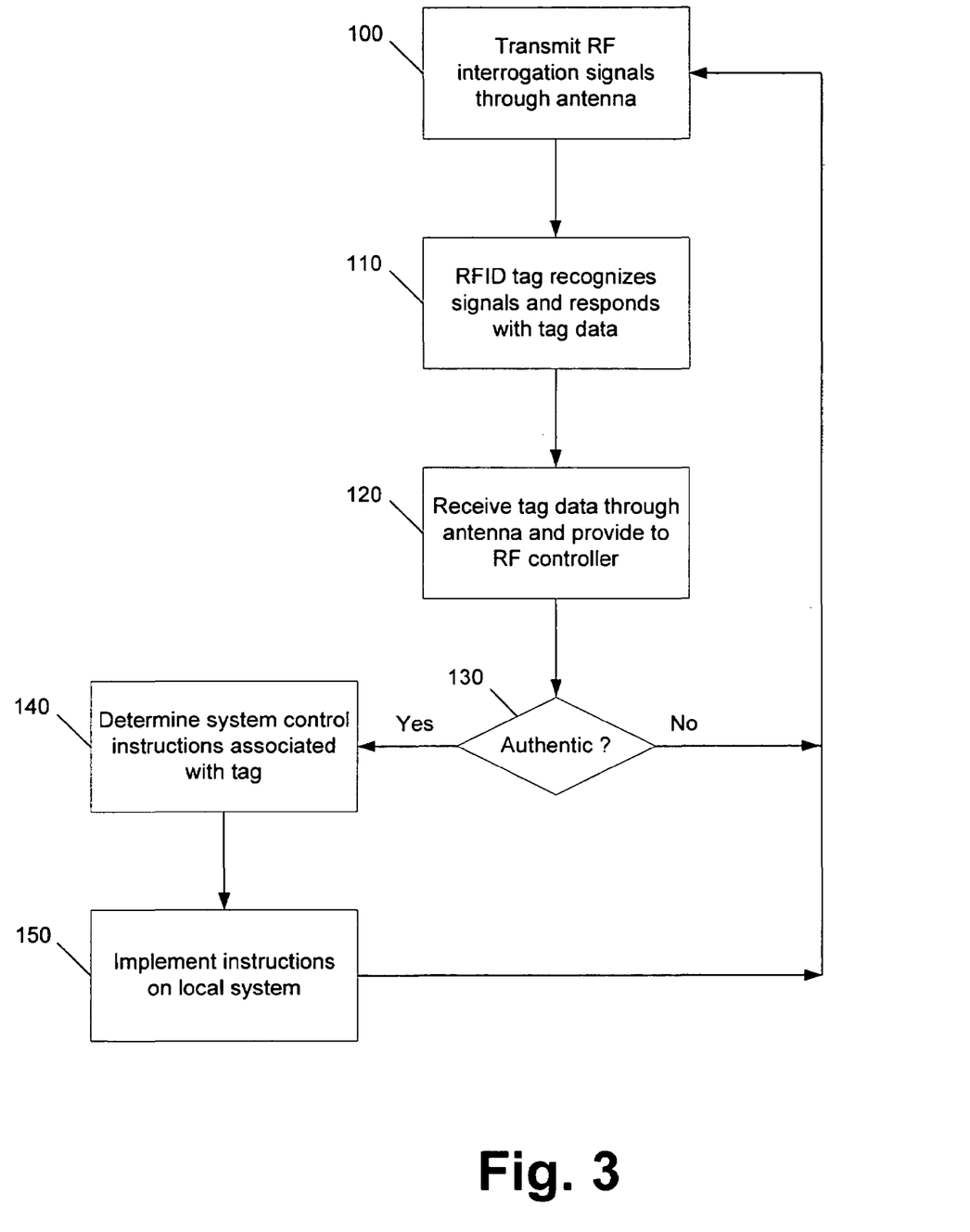
FIG. 3 is a flow diagram of an exemplary method of determining the presence of a user in accordance with the present invention.

FIG. 2 is a block diagram of an exemplary RFID system including a keyboard in accordance with the present invention. FIG. 3 is a flow diagram of an exemplary method of determining the presence of a user in accordance with the present invention. FIG. 2 contains elements similar to those described above with respect to FIG. 1. These elements are labeled identically are their description is omitted for brevity.

In FIG. 2, the detector, comprising the antenna 30, the RFID interrogator 35, and the RFID controller 40, is disposed within a keyboard 20. The keyboard 20 is connected by either wired or wireless technologies to a computer, such as a personal computer (PC) 50, which comprises the central controller 60. For example, the keyboard 20 might have a USB hub and the PC 50 might have a USB port, and a USB cable connects the keyboard 20 and the PC 50. It is contemplated that any device, and not only the keyboard 20, can be used to house the detector. Similarly, any device, and not only the PC 50, can be used to house the central controller 60. Moreover, the detector system can be disposed within the PC 50.

The RFID tag 10 is preferably disposed on a card or badge 5 that will be desirably be present with the user, such as embedded in an employee identification badge worn by the user.

The antenna 30, which desirably resides on the keyboard 20, broadcasts interrogating signals, at step 100. The electromagnetic field produced by the antenna 30 can be constantly present or pulsed at a given interval, such as every three seconds. The passive RFID tag 10 associated with the user recognizes the interrogating signals and responds with a presence signal, at step 110. The presence signal preferably comprises data that identifies the user or tag data. According to an example, the tag data is divided into three fields, each is 32-bit in length. The fields could be, for example, "Device ID" (user's name would be in this field), "Location Data" (mobile or fixed), and "Serial Number". This schema can be customized.

The RFID controller 40 receives the tag data (via the antenna 30 and the RFID interrogator 35) and decodes it, if desired, at step 120. The RFID controller 40 then sends the information to an optional authentication system, which may reside locally or within the PC 50, for example. Then, optionally, the RFID tag is authenticated, at step 130.

It is desirable to have the antenna disposed on the keyboard or near the desktop, because the RFID detector system can be used for other tasks such as scanning for security purposes and/or used in conjunction with secure login procedures. For example, the user ID could be authenticated for the system the user is working on. The authentication system, if any, uses conventional authentication techniques to verify that the ID tag is authentic (e.g., has not be spoofed, and is accurate). If the tag is determined to be not authentic and hence invalid, its processing discontinues, and the overall process resumes at step 100.

After the tag is authenticated, or if authentication is not implemented in the system, then system control instructions associated with the tag are retrieved or otherwise determined, at step 140. More particularly, the PC 50 acts upon the information contained within the received RFID tag data, either directly (e.g., the information contains instructions) or by accessing a storage device and looking up predetermined rules or instructions associated with the received RFID tag data. Lookup tables or other data storage and retrieval techniques may be implemented to associate RFID tag data with system control instructions. The rules or instructions are then implemented, at step 150. These rules or instructions can be used to switch the operating mode of the PC 50, for example. Processing continues at step 100.

The RFID controller 40 is desirably deployed in one of four configurations: fixed mount, PCMCIA device, PCI card, or integrated on the motherboard.

The distance from the RFID tag 10 to the detector (and hence the keyboard) can also be determined. The detector, comprising the antenna 30, the RF interrogator 35, and the RF controller 40, can determine the range of the RFID tag 10 by measuring the time of a returned signal from the RFID tag 10. Alternatively, the strength of the returned signal from the RFID tag 10 or its waveform shape may be used by the detector to determine the range of the RFID tag 10. As the time, strength, or waveform changes with each received RFID tag signal (transmitted to the detector responsive to successive cycles of interrogating signals), it can be determined whether the RFID tag 10, and hence the user, is approaching the keyboard 20 or moving away from the keyboard 20.

This movement detection can be used by the central controller 60, for example, to determine whether to activate the computer 50 (e.g., maintain the monitor in the on state) or deactivate the computer 50 (e.g., put the computer in a sleep mode, lock the computer, or turn the computer off) in accordance with the instructions that have been determined pursuant to the received tag data. Thus, the location of the user (i.e., the RFID tag) is determined with respect to the keyboard. Preferably, this information can be used to determine the distance and bearing of the user (e.g., moving away or toward the desktop or laptop). This would allow the devices to be instructed to appropriately enter standby or sleep or wake mode. For example, if it is determined that the user is moving away from the keyboard, toward the door, the laptop could enter sleep mode. If the user is moving toward the keyboard, the laptop could awaken and be ready for usage as the user approaches the keyboard. This will save time for the user and power for the laptop.

According to an embodiment, the reader determines the user's presence by detecting the tag on the user's ID, reading the device ID field, and calculating the response time between when the signal is sent to the tag and received from the tag to determine relative distance and bearing, similar to sonar. Alternatively, after reading the device ID field, a tag residing in a fixed location (e.g., the user's phone or monitor, a phone in a conference room) can be read, and that information provided to the PC 50 (or other computer) to triangulate the user's location.

Figure 4:
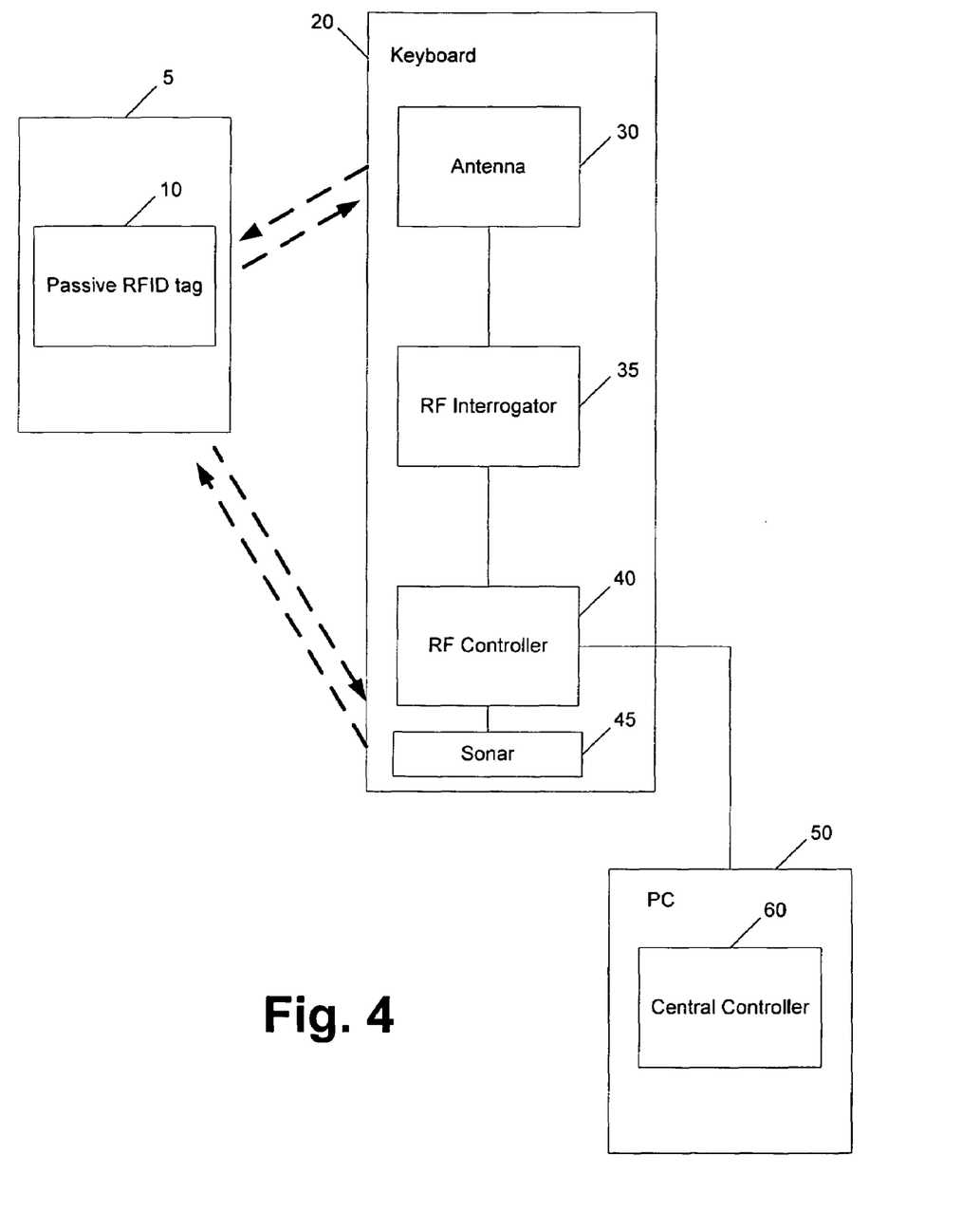
FIG. 4 is a block diagram of an exemplary RFID system including sonar in accordance with the present invention.
Figure 5:
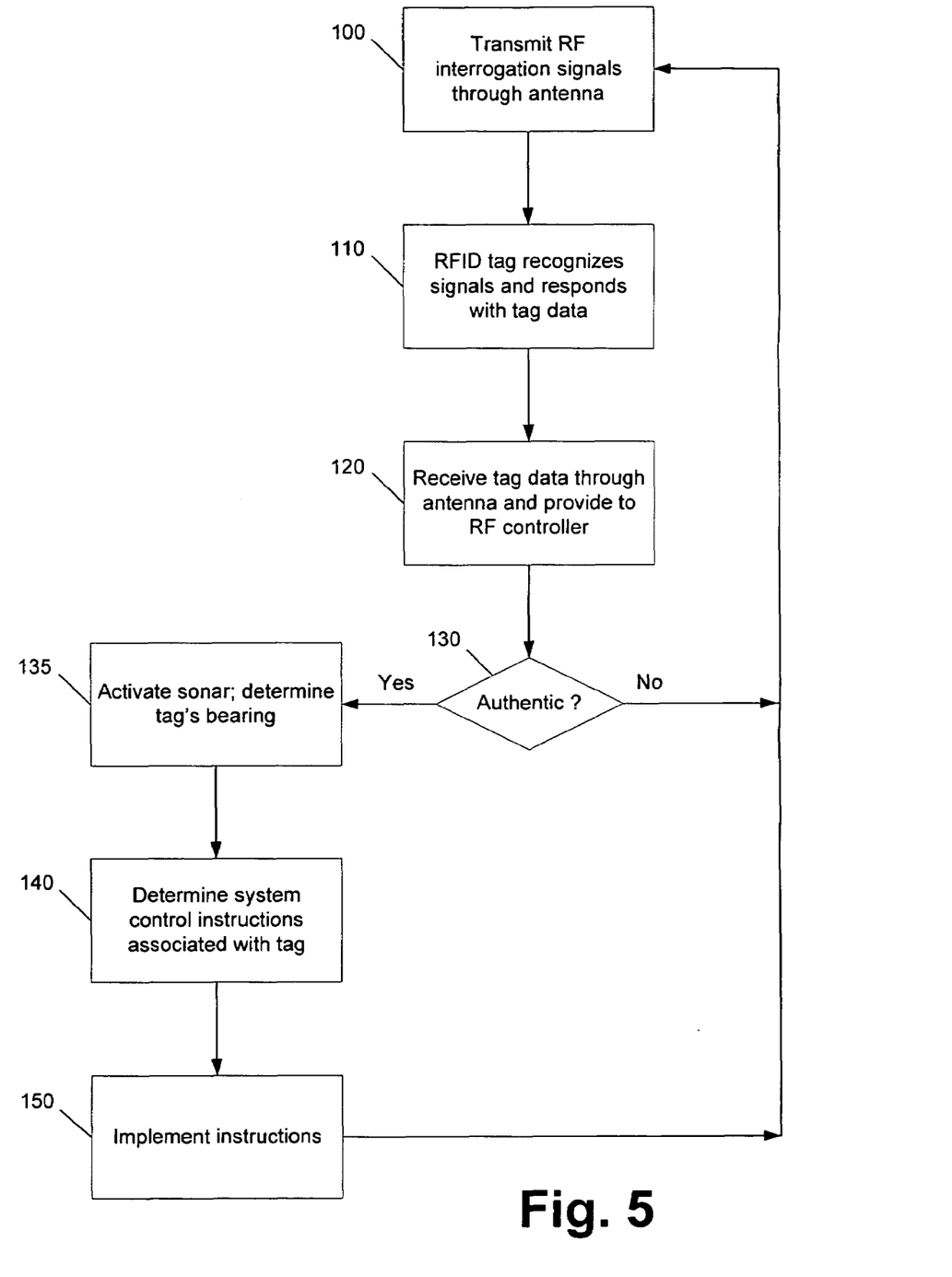
FIG. 5 is a flow diagram of another exemplary method of determining the presence of a user in accordance with the present invention.

According to a further embodiment, sonar could be used in conjunction with the RFID tag to determine distance and bearing of the user. For example, after recognizing a user with the RFID tag, then the sonar is activated. FIG. 4 is a block diagram of an exemplary RFID system including sonar in accordance with the present invention, and FIG. 5 is a flow diagram of an exemplary corresponding method. FIG. 4 contains elements similar to those described above with respect to FIG. 2, and FIG. 5 contains elements similar to those described above with respect to FIG. 3. These elements are labeled identically are their description is omitted for brevity.

A sonar unit 45 is desirably incorporated into the keyboard, but can be incorporated elsewhere. For example, the sonar unit can be disposed as a standalone unit, or can be incorporated into another device, such as the PC 50. After the RFID tag 10 sends its presence signal to the detector, and is authenticated at optional step 130, the RF controller 40 directs the sonar unit 45 to activate, at step 135. At that point, the sonar unit 45 locates and tracks the RFID tag 10. The distance and bearing of the RFID tag 10, and thus the user, can be determined using sonar techniques.

The user distance and bearing information is desirably provided to the central controller 60. The central controller 60 acts on this information accordingly. For example, if the central controller 60 determines that the user is leaving the room, (e.g., using predetermined rules and/or algorithms), the central controller 60 puts the computer in standby or sleep mode, or disables the computer. In this manner, an unauthorized user will not then be able to see the screen or otherwise legitimately access the original user's data. Moreover, power savings can be realized. The predetermined rules and/or algorithms can be stored in memory in the PC 50 that is accessible to the central controller 60. The predetermined rules and/or algorithms may also be stored in memory associated with the detection system (e.g., reside within the keyboard 20).

The sonar can also be used to recognize when a user is approaching the keyboard 20, and thus it can be assumed the user will be approaching to use the keyboard 20 and PC 50. In such a case, the central controller 60 can recognize the approaching user and, based on stored rules, power up and/or log in the user.

When multiple devices are present or available, it would be desirable to know which users are present and the device(s) each user is authorized to access. For example, certain users will be authorized to use certain devices and not others. According to an embodiment of the invention, a list of valid users and rules is maintained in storage, and these users will be authorized to access various devices in the system, pursuant to the rules in storage. For example, if a user is in the room, and his RFID tag identifies him as being authorized, he will have access to use the telephone and computer, for example. Unauthorized persons will be prevented from using these devices (i.e., locked out).

Figure 6:
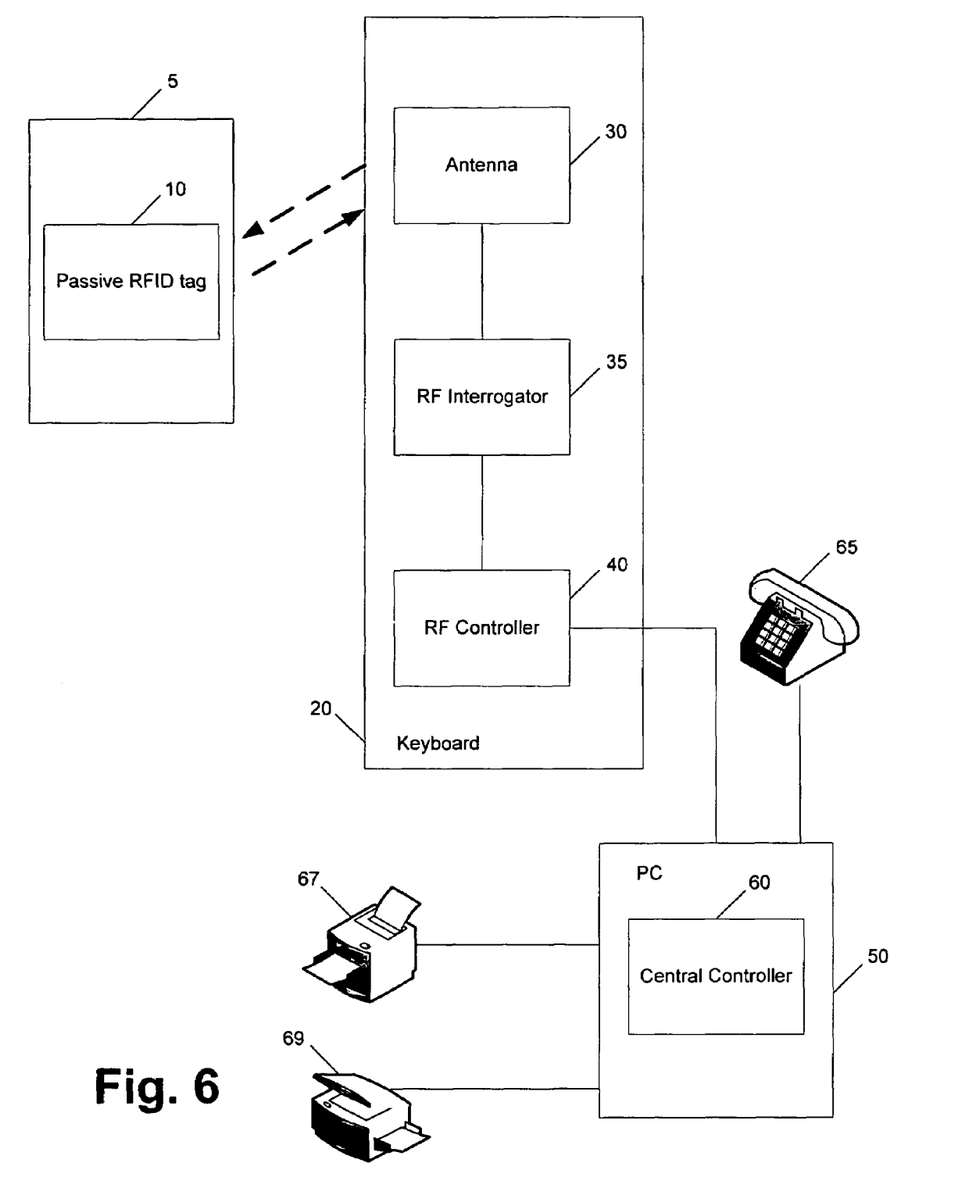
FIG. 6 is a block diagram of an exemplary RFID system including multiple devices to be controlled in accordance with the present invention.
Figure 7:
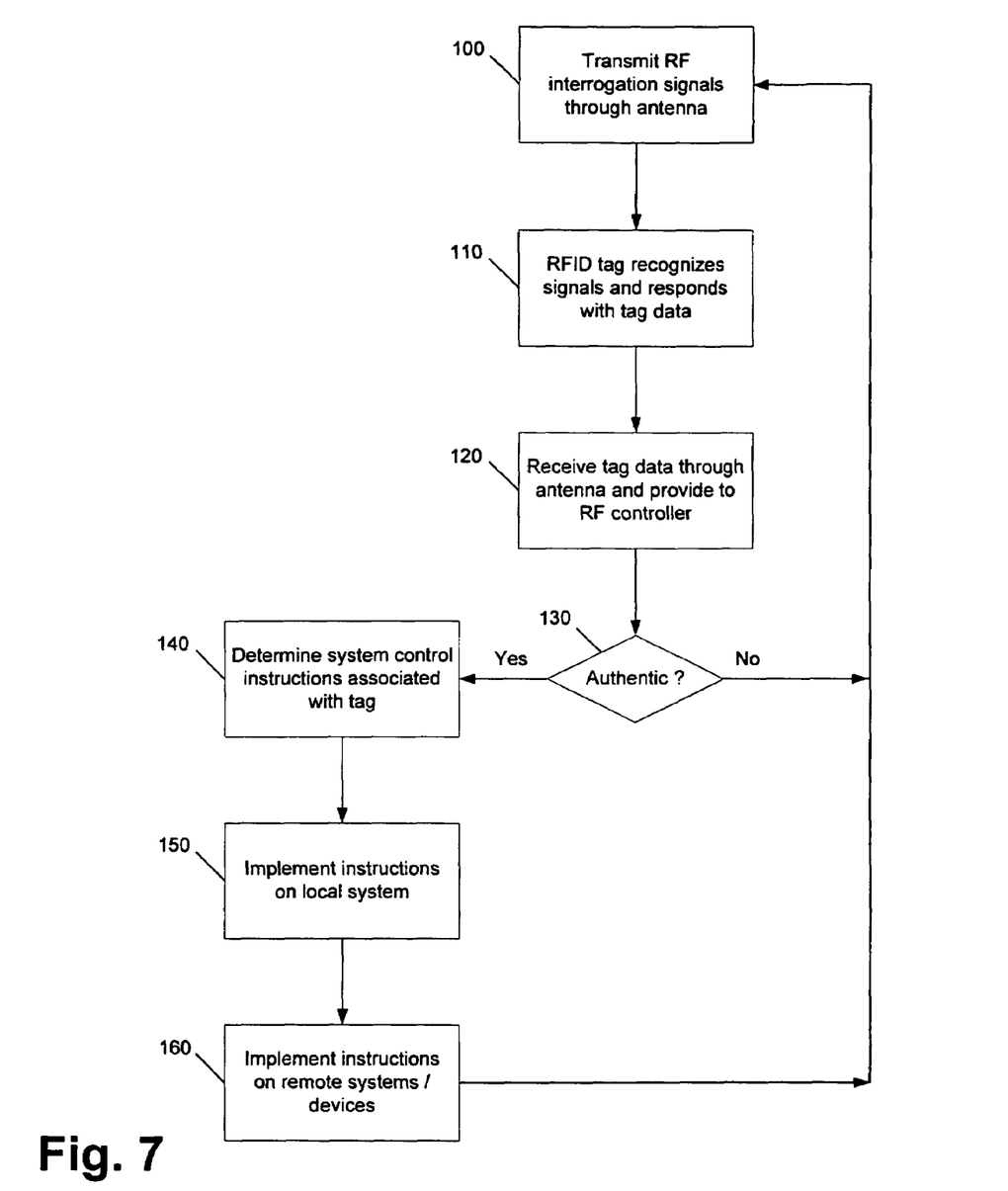
FIG. 7 is a flow diagram of an exemplary method of controlling devices by determining the presence of a user in accordance with the present invention.

FIG. 6 is a block diagram of an exemplary RFID system including multiple devices to be controlled in accordance with the present invention, and FIG. 7 is a flow diagram of a corresponding exemplary method. FIG. 6 contains elements similar to those described above with respect to FIG. 2, and FIG. 7 contains elements similar to those described above with respect to FIG. 3. These elements are labeled identically are their description is omitted for brevity.

Various devices, such as a telephone 65, a fax machine 67, and a photocopier 69, are connected to the PC 50, either through wired or wireless technologies. The stored rules or instructions associated with the various user's tags (and thus the various users) provide authorization to use, and activate, the various devices 65, 67, 69 if the user is permitted access to use these devices. The access will be granted pursuant to the tag data in the RFID tag 10 and the rules and instructions provided to the central controller 60. After the user is authenticated at optional step 130, the system control instructions and rules associated with the tag (and thus the user) are determined and implemented on the local system 50 (as set forth above with respect to FIGS. 2 and 3) and on the remote systems or devices which may include devices 65, 67, 69. In this manner, one user may be granted access to a telephone 65, but be prevented from using the fax machine 67 and photocopier 69, while another user may have access to the fax machine 67 and photocopier 69 and not be permitted to use the telephone 65. It is contemplated that the devices 65, 67, 69 can be in the same room as the user (and thus the RFID tag 10) and/or the PC 50 or remotely located (e.g., the user, the telephone 65, and the PC 50 are in the user's office, and the fax machine 67 and photocopier 69 are located in a shared printer center).

Moreover, lights and other devices in the room could be set up so that when a person enters the room, his RFID tag is identified, and the devices are put into the operating modes predetermined by a set of rules for that user. In other words, the desktop could control other devices such as telephones and lights based on user-programmed or other predetermined policies or rules. The policies or rules could be stored at the desktop, for example. The set of rules may be determined by the user and/or by a central authority or administrator.

Another contemplated embodiment is directed to the handling of an incoming telephone call. If a telephone call comes in to the telephone associated with central controller 60 (e.g., to telephone 65), the system determines if the user is in the room. This determination can be performed using the interrogation described with respect to FIGS. 2 and 3, for example. If the RFID tag 10 of one authorized to use the telephone 65 responds to the interrogation signal, then it is determined that an authorized user is in the room, and the call is rung through to the telephone 65. However, if there is no response from an RFID tag 10 of an authorized user to the interrogation signal, it is determined that such a user is not available (e.g., is not in the room), and the call is otherwise disposed of (e.g., forwarded to a voice messaging system).

Another contemplated embodiment involves the recognition of multiple RFID tags concurrently to determine which users are in the room. The detector and/or the PC 50 preferably maintains a record or log of the RFID tags that are present (within range, for example) at a particular time. This record or log can be stored in a storage device (not shown) and updated at predetermined intervals or other times. In this manner, multiple users can be tracked and can be identified when they are in a room, for example. This would allow a teleconferencing system to recognize everyone who is in a room, entering a room, or leaving a room, for example.

It is contemplated that collisions can occur, for example, when multiple RFID tags occupy the same RF channel. Accordingly, collision detection is preferably used to avoid or otherwise overcome the collisions between the data packets or signals of the variously transmitting RFID tags. For example, where collisions occur, repeat transmissions are desirably used until all the data packets are properly received.

Although the above embodiments have been described with respect to the RFID reader (detector system) residing in a keyboard, the RFID reader can be disposed within any device, such as encapsulated within a PCMCIA device or integrated on a PCI card/motherboard. Alternatively, the reader could be portable, such as in a Windows CE-based portable device.

Exemplary Computing Environment

Figure 8:
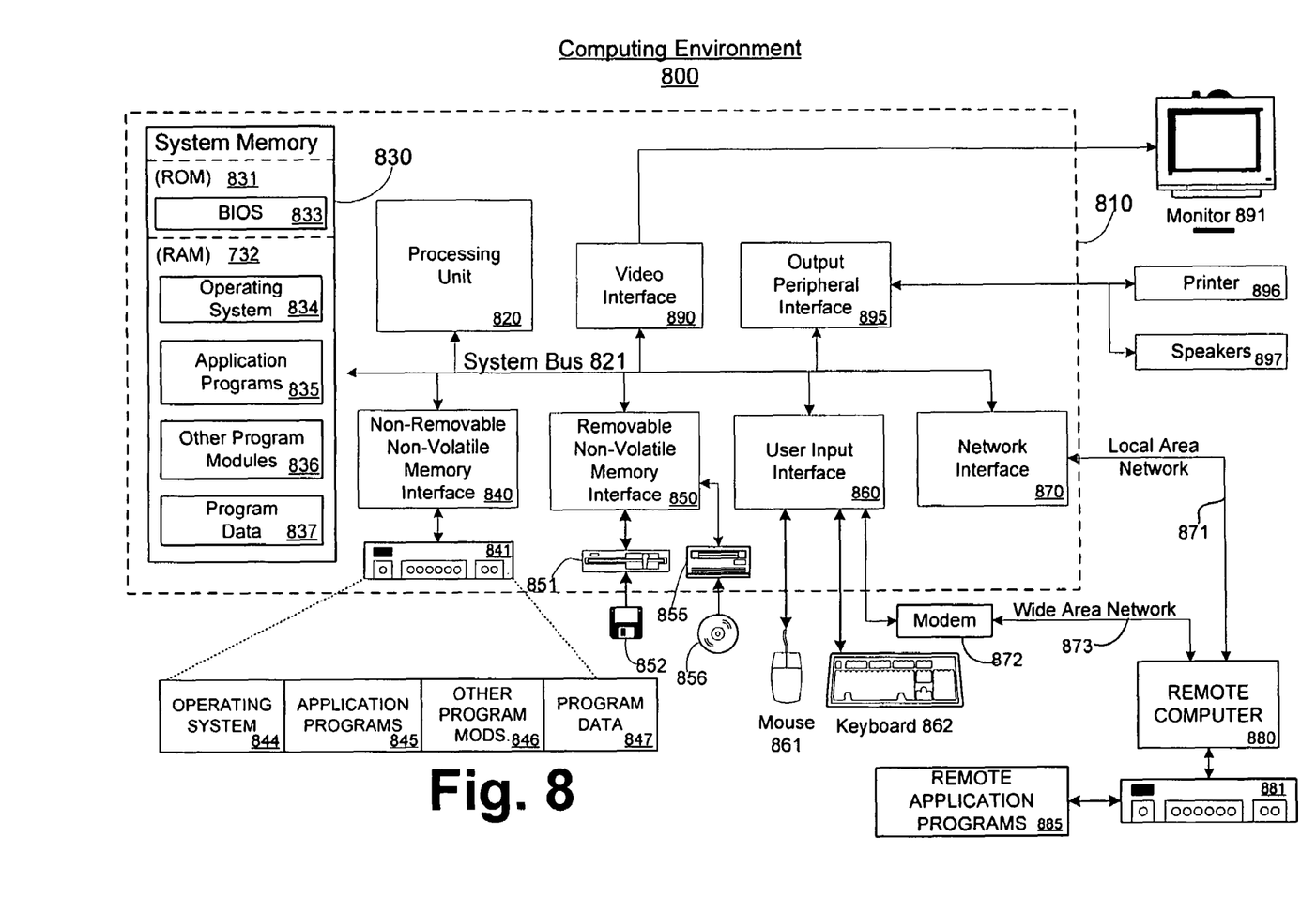
FIG. 8 is a block diagram showing an exemplary computing environment in which aspects of the invention may be implemented.

FIG. 8 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/non-volatile computer storage media. By way of example only, FIG. 8 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for determining presence and providing control, comprising:
    a radio frequency identification (RFID) tag;
    a detector comprising an antenna, an RE interrogator, and an RF controller, the detector adapted to transmit interrogation signals to the RFID tag, to receive and decode presence signals from the RFID tag to determine whether the RFID tag is approaching the detector or moving away from the detector, and to generate instruction signals based on whether the RFID tag is approaching the detector or moving away from the detector; and
    a central controller remote from the detector and adapted to receive the instruction signals and control at least one associated device in accordance with the instruction signals.

2. The system of claim 1, further comprising a card comprising the RFID tag.

3. The system of claim 1, wherein the at least one device comprises a computer, and the computer comprises the central controller.

4. The system of claim 3, further comprising a keyboard comprising the detector.

5. The system of claim 1, wherein the central controller determines control signals based on the received instruction signals and controls the at least one device in accordance with the control signals.

6. The system of claim 1, wherein the instruction signals comprise rules associated with the RFID tag.

7. The system of claim 1, wherein the detector determines the range of the RFID tag and transmits the range to the central controller, the central controller controlling the device based on the range.

8. The system of claim 7, wherein the central controller deactivates the device if the range is beyond a threshold.

9. The system of claim 7, wherein the central controller maintains the current operating status of the device if the range is less than a threshold.

10. The system of claim 7, wherein the central controller changes the operating mode of the device as the range changes.

11. The system of claim 7, wherein the central controller prevents access to the device if the range is beyond a threshold.

12. The system of claim 7, wherein the central controller provides login information to the device, the login information associated with the RFID tag, when the range is less than a threshold and the current operating status of the device is off or if the device is locked.

13. The system of claim 1, wherein the central controller maintains the operating mode of the device based on the detection of the RFID tag.

14. The system of claim 1, further comprising sonar for determining the range of the RFID tag.

15. The system of claim 14, wherein the detector comprises the sonar.

16. The system of claim 1, wherein the at least one device comprises at least one of a telephone, a fax machine, and a photocopier.

17. The system of claim 1, wherein the detector is adapted to receive presence signals from a plurality of RFID tags, and the central controller controls the at least one device in accordance with the information received from the RFID tags.

18. A method for determining presence and providing control, comprising:
    receiving a presence signal from at least one radio frequency identification (RFID) tag at a detector comprising an RF controller;
    determining whether the RFID tag is approaching the detector or moving away from the detector based on the presence signal;
    generating an output signal in response to the presence signal and whether the RFID tag is approaching the detector or moving away from the detector;
    providing the output signal to a remote central controller; and
    controlling at least one device, via the remote central controller, based on the output signal.

19. The method of claim 18, further comprising searching for the presence of the RFID tag by transmitting an interrogating signal at predetermined intervals.

20. The method of claim 18, further comprising receiving a plurality of presence signals, each signal associated with a different one of a plurality of RFID tags, and controlling the at least one device in accordance with the information received from the RFID tags.

21. The method of claim 18, further comprising decoding the presence signal prior and generating the output signal based on the decoded presence signal.

22. The method of claim 18, wherein the output signal comprises instructions and rules for the remote controller to implement on the at least one device.

23. The method of claim 18, further comprising determining the range of the RFID tag.

24. The method of claim 23, wherein determining the range comprises using sonar to determine the range.

25. The method of claim 23, further comprising changing the operating mode of the at least one device based on the range of the RFID tag.

26. The method of claim 25, wherein changing the operating mode comprises preventing access to the device of the range is beyond a threshold.

27. The method of claim 25, wherein changing the operating mode comprises deactivating the device if the range is beyond a threshold.

28. The method of claim 25, wherein changing the operating mode comprises maintaining the current operating status of the device is the range is less than a threshold.

29. The method of claim 18, further comprising embedding the RFID tag into a portable card, and disposing the detector in a keyboard.

30. The method of claim 18, further comprising providing information to the device, the login information associated with the RFID tag, when the range is less than a threshold and the current operating status of the device is off or if the device is locked.

31. The method of claim 18, wherein the at least one device comprises at least one of a computer, a telephone, a fax machine, and a photocopier.

* * * * *

UNITED STATES PATENT AND TRADEMARK OFFICE
CERTIFICATE OF CORRECTION

PATENT NO. : 7,061,366 B2  Page 1 of 1
APPLICATION NO. : 10/822500
DATED : June 13, 2006
INVENTOR(S) : Bell et al.

It is certified that error appears in the above-identified patent and that said Letters Patent is hereby corrected as shown below:

In column 11, line 25, in Claim 1, delete "RE" and insert -- RF --, therefor.

Signed and Sealed this

Twentieth Day of April, 2010

David J. Kappos
*Director of the United States Patent and Trademark Office*